United States Patent [19]

Gaer

[11] Patent Number: 4,924,448
[45] Date of Patent: May 8, 1990

[54] BISTATIC SYSTEM AND METHOD FOR OCEAN BOTTOM MAPPING AND SURVEYING

[76] Inventor: Marvin C. Gaer, 1756 Morris Dr., Cherry Hill, N.J. 08003

[21] Appl. No.: 321,084

[22] Filed: Mar. 9, 1989

[51] Int. Cl.$^5$ .............................................. G01S 15/00
[52] U.S. Cl. ....................................................... 367/88
[58] Field of Search ............................ 367/88, 99, 907

[56] References Cited

U.S. PATENT DOCUMENTS

| | | | |
|---|---|---|---|
| 3,805,222 | 4/1974 | Pekau | 367/88 |
| 4,197,591 | 4/1980 | Hagemann | 367/6 |
| 4,207,620 | 6/1980 | Morgera | 367/88 |
| 4,325,065 | 4/1982 | Caputi, Jr. | 342/190 |
| 4,422,166 | 12/1983 | Klein | 367/115 |
| 4,493,064 | 1/1985 | Ordero et al. | 367/92 |
| 4,561,076 | 12/1985 | Gritsch | 367/88 |
| 4,602,257 | 7/1986 | Grisham | 342/25 |
| 4,751,512 | 6/1988 | Longaker | 342/357 |

*Primary Examiner*—Thomas H. Tarcza
*Assistant Examiner*—Daniel T. Pihulic
*Attorney, Agent, or Firm*—Marvin C. Gaer

[57] ABSTRACT

A bistatic system and method is disclosed for mapping a large swath of the ocean bottom on a single sweep using two survey ships traveling approximately side-by-side some distance apart on parallel courses. Each ship transmits a fan shaped sonic pulse or ping symmetrically downward about the vertical and transverse to the ship's longitudinal axis and processes the backscattered echo for depth. The forward scattered portion of this pulse or a second sonic pulse transmitted downward at an angle between the ships toward the other ship is received by the other ship and is analyzed to determine ocean bottom depths of the swath between the ships. The analyzed width of an insonified swath portion is sufficiently wide so as to overlap, at an edge, with an edge of each adjacent insonified swath portion analyzed. This partial redundancy provides a means for continuous calibration by comparing depth determinations for consistency and accuracy. Precise global navigational fixes and relative intership positional fixes are to be provided by the satellite Global Positioning System (GPS) as well as other navigational systems.

17 Claims, 7 Drawing Sheets

BISTATIC SYSTEM AND METHOD FOR OCEAN BOTTOM MAPPING AND SURVEYING

BACKGROUND OF THE INVENTION

This invention is concerned with the precision mapping of the ocean bottom through the transmission and reception of sonar or sonic pulses called "pings". Currently, such a mapping is usually performed by a single survey ship carrying sonar sounding equipment, traveling along a prescribed course while transmitting and receiving flat fan shaped sonic pulses directed downward, transverse to the ship's longitudinal axis. The location of the ship, the round trip timing and angle of reception of the pulses scattered off the ocean bottom are recorded and further analysis yields level depth contour curves for a portion of the swath of the ocean bottom insonified by these pulses. The swath of ocean bottom mapped in this manner is approximately a region lying symmetrically along and below the survey ship's track. This swath has an angular opening limited to about 30 to 45 degrees on either side of the downward vertical, since wider angled backscattered pulse reflections are often too weak and diffuse to give reliable depth data. Furthermore, if the ocean bottom in some locale is particularly smooth, backscattering of the signal may not provide a distinct enough echo to allow effective measurements, because most of the pulse may be dissipated by being scattered specularly forward away from the vertical.

Shallow water depth measurements with the method now used also prove to be inefficient. The restricted angular opening of the insonified swath in shallow water results in the mapping of such a narrow region that a large number of passes are required to produce continuous map coverage.

On-going internal calibration and adjustment of the depth measurements is also not practical, since only a single beam is transmitted and, therefore, no matching data is available for comparison unless multiple passes are made over the same region.

Further limitations of accuracy result from systemic navigational errors. Until recently, the precision required in the mapping of the ocean bottom was limited by varying uncertainties in positional fixes due to these navigational errors. The inability to sharpen positional fixes precluded the use of more than one ship to map a broader swath while adhering to the required mapping accuracy tolerances, since using more than one ship tended to compound navigational and positioning errors.

SUMMARY OF THE INVENTION

This invention proposes a bistatic system and method for mapping a large swath of the ocean bottom using two survey ships. In the preferred embodiment which is described herein, one survey ship is designated the master and the other survey ship is designated the follower. The two ships travel essentially parallel courses some distance apart, the distance determined by the depth of the ocean in this locality, the sea state, the strength of the signals, temperature of the water, salinity, and ambient noise, among other things. The ships remain in constant communication with each other, their global location determined accurately by the Navstar Global Positioning System (GPS) and their relative position with respect to each other determined by differential or relative GPS techniques. The master ship makes all the decisions with respect to course corrections and the timing of the sonar ping transmissions from both ships. A phased array system of ping projectors and hydrophones determines the patterns of sonic pulse transmission and reception. Each ship pings on command of the master ship, and the insonification pattern is as follows:

(a) Each ship transmits the essentially fan shaped pulse symmetrically downward about the vertical and transverse to the ship's longitudinal axis as in the current system, and receives the backscattered echo as now. This reception is processed and analyzed as in the current system for depth.

(b) Each ship transmits a second slant pulse directed by beamforming at an angle downward so that the forward scattered or reflected echo is received by the other ship. This pulse transmission will then insonify a portion of the ocean bottom between the two ships, which may extend outside the insonification patterns described in (a) above. It is anticipated that each pulse pattern would be directed so that its insonification area would overlap at its edge with the edge of an adjacent insonified area. This redundancy in analyzing echoes from overlapping areas provides an internal check and calibration of the system as the mapping progresses, since in the overlapping insonified areas there should be substantial agreement as to the depths.

(b') An alternative approach may be used if the fan shaped pulse described in part (a) has sufficient intensity over a wide enough angle about the vertical. In this case the forward scattered portion of the pulse of one ship can be intercepted and processed by the other ship as through it were the second slant pulse of part (b). This approach would require only one set of fan shaped pulses from each ship. The transmitted insonification pattern formed by the two pulses would overlap about the mid-line between the two ships. The extent of the pattern analyzed by each ship is to be sufficient to overlap with that of the other ship for calibration purposes as described above.

Both ships are kept current in real time with the results of the mapping as it progresses. Course and mapping corrections and adjustments are continuously being made depending on the position of the ships and the results of the mapping.

Also, to avoid confusing the various sonic pulses, each transmission portion might use a different pulse frequency, thus four frequencies or more might be required.

The direction, reception, processing and analysis of the signals is to be based on phased array techniques. It is expected that with appropriate modifications present signal processing and mapping equipment and techniques would suffice to accomplish the procedures outlined.

Thus, a principal feature of this invention is the use of two survey ships to create and map a much larger insonification pattern than can be done by two ships operating independently. This will result in the mapping of a much wider swath than just double the single ship swath, while allowing a significant reduction in the amount of time necessary to map and survey designated ocean areas.

Another feature of this invention is that the overlapping processing of the insonified areas allows for continuous consistency checking, calibration, and correction during the surveying process. This would lead to more accurate maps and greater flexibility in determining which areas needed more or less concentrated surveying.

Another feature of this invention is that the intership acoustic signals are more specular and involve forward scattering, therefore smooth ocean bottoms, which have been difficult to map in the current backscattered echo system, should be easier to map in the proposed system. Also, forward scattering produces a stronger and more distinct signal than backscattering, thus allowing large intership distances and greater transmission and reception angles to be maintained.

Another feature of this invention is the use of satellite GPS to determine both general and relative positional fixes which allows precision control of the bistatic process and accurate mapping over large survey ship separations.

Another feature of this invention is that by using intership transmissions involving two independent signals, there is an enhanced potential for performing acoustic imaging. This imaging could be exploited to solve certain surveillance, identification, and tracking problems as well as providing a facility for locating commercially valuable mineral deposits such as manganese nodules or petroleum.

Another feature of this invention is that a bistatic system leads to a more efficient and economical means of mapping shallow ocean regions, since two ships operating in tandem can map a larger swath than two ships operating independently in relatively shallow water.

It should also be noted that although it is desirable to be able to control the alignment of both ships with respect to each other, tight control is usually not required in this system. Approximate alignment will suffice so long as precise information is available to the system regarding timing and the position of the ships when the pulse is transmitted and when the echo is received. Computer processing of the data will be able to compensate for moderate misalignments.

BRIEF DESCRIPTION OF THE DRAWINGS

An embodiment of the invention is described by way of example with reference to the accompanying drawings in which.

MORE DETAILED DESCRIPTION OF A PREFERRED EMBODIMENT

Figure 1:
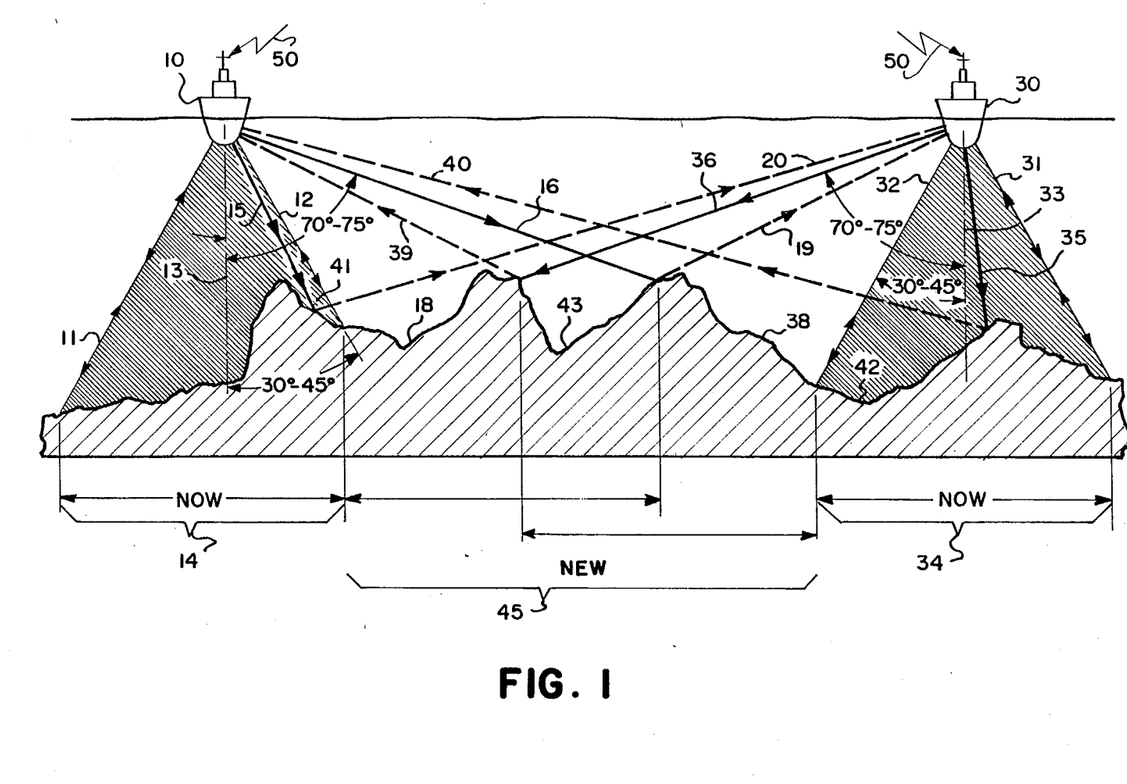
FIG. 1 is a diagrammatic transversal vertical section showing the spatial relation of the two survey ships with each other, the approximate angular relations of the acoustic ray beams and different portions of the insonification patterns on the ocean bottom (not drawn to scale) which is being mapped.
Figure 2:
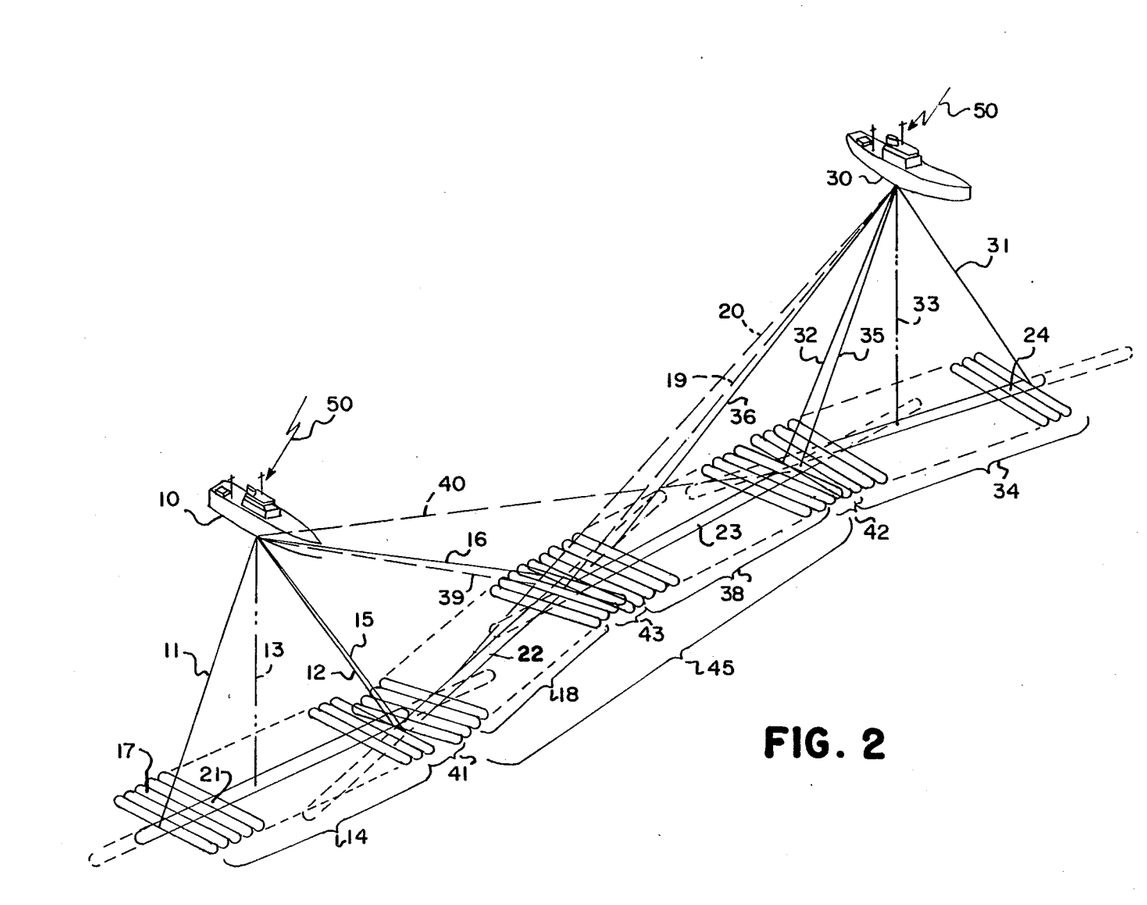
FIG. 2 is a frontal elevated perspective diagrammatic view of two survey ships and their approximate insonification patterns.
Figure 3:
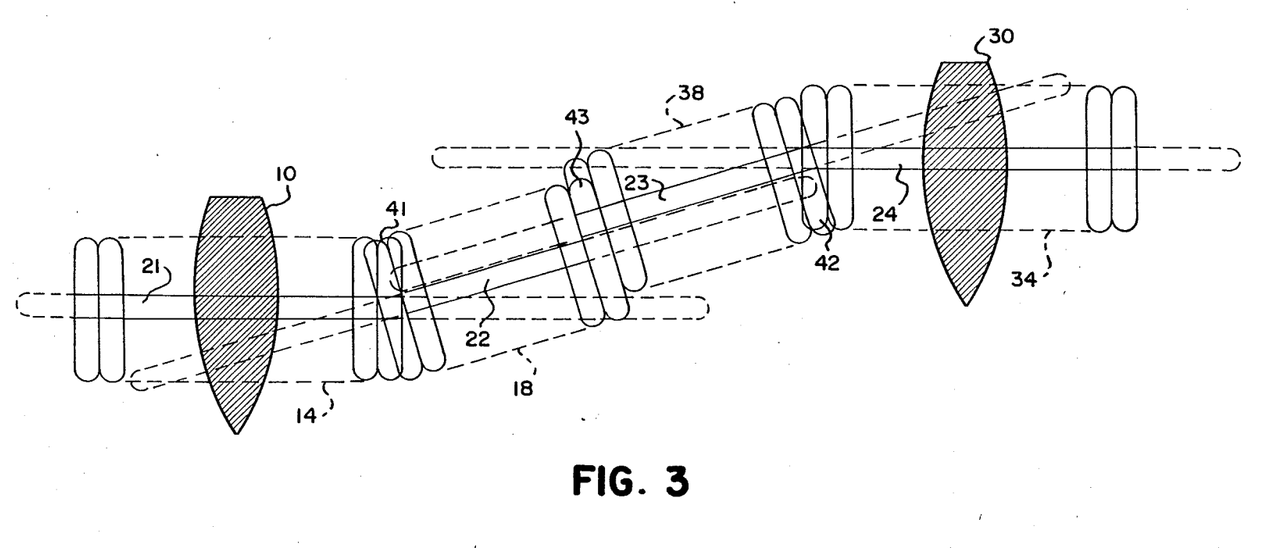
FIG. 3 is a view from above of the two survey ships showing a possible spatial relation between the two ships and the insonified areas of the ocean bottom.

FIGS. 1, 2, and 3 are different views of the bistatic system showing the two survey ships, 10 and 30, the various sonar beam rays and the insonified areas of the ocean bottom.

Referring to FIGS. 1, 2, and 3, the survey ships, 10 and 30, will arbitrarily be labeled the master ship and follower ship, respectively. Each ship receives positional information from the Global Positioning System (GPS) satellites drawn symbolically as the zig-zag lines 50, as the ships follow approximately side-by-side parallel courses. This GPS information provides each ship with accurate global navigational information while the differential or relative GPS feature provides them with precise relative positional data with respect to each other. The two ships are in virtually continuous communication with each other and the master ship 10 makes all the decisions with respect to course corrections, speed, timing of the pulses, and beam directions.

The anticipated sonic pulse or ping program which will be carried out is herein described, although variations are possible depending on circumstances. Each ship will direct a fan shaped pulse downward and receive the backscattered echo. For ship 10 (resp. 30) this ping and its outer measured backscattered limits is represented by rays 11 and 12 (resp. 31 and 32) each limiting ray forming an approximately 30 to 45 degree angle with the downward directed vertical 13 (resp. 33), the angle being approximately transverse to the center line of the keel. Arrows on the rays indicate the direction the ray is traveling. Some rays indicate both transmission and reflection. The transmitted signal insonifies the region of the ocean floor 21 (resp. 24) which is the source of the backscattered echo to be received and analyzed. Regions 21 and 24 are in fact the actual regions of the ocean bottom the depths of which are measured by the central backscattered signals of the survey ships 10 and 30, respectively. Also in FIG. 2, the subregion 17 indicates schematically a discrete subregional area surveyed by the reception hydrophones, while the collection of such subregions 14 (resp. 34), indicates the total central region surveyed by each ship's hydrophones as in the current single survey ship system.

In FIGS. 2 and 3, the central insonified regions 21 and 24 are shown as being essentially transverse to the center lines of the keels of the respective ships 10 and 30. In fact, because of the forward velocity of each ship, there will be slight lateral rotations of each region about the downward vertical leading to a small cross track error. This error is corrected for in the analysis of the data by standard techniques. The magnitude of this error is dependent on the speed of the ships and the local ocean depth.

Actually larger regions than 21 and 24 are insonified by the central beams as indicated by the dashed line extensions of regions 21 and 24. However, backscattering and accuracy become problematical beyond the 30-45 degree angular limits indicated. It is this limitation which restricts the single ship or monostatic surveys to narrow swath maps.

Again referring to FIGS. 1, 2, and 3, each survey ship may also be required to direct a pulse, slant ping, away from the downward vertical, to be reflected or forward scattered off the ocean floor towards the other ship, if the forward scattered portion of the central pulse is too weak to adequately insonify a sufficiently large swath between the ships. For ship 10 (resp. 30) this transmitted pulse is represented by the downward directed rays 15 and 16 (resp. 35 and 36) indicating the approximate minimum and maximum angles that these rays make with the downward vertical. For ray 15 (resp. 35) the angle with the vertical is somewhat less than that of 12 (resp. 32) to allow for the partial overlapping of the insonified region of the slant beam with that of the adjacent central beam, i.e., the insonified regions included in the overlapping surveyed regions labeled 41 (resp. 42).

The ray 16 (resp. 36) forms an angle of approximately 70 to 75 degrees with the downward directed vertical 13 (resp. 33). Rays 16 and 36 provide the outer limits of the insonified regions between the survey ships. Rays 15 and 16 (resp. 35 and 36) define the insonified region 22 (resp. 23). The hydrophones of survey ship 10 (resp. 30) survey the region 38 (resp. 18). The combined surveyed intership region 45 between the survey ships includes a central section 43 formed by the overlapping surveillance of reception hydrophones on each ship. The angle of 70 to 75 degrees is approximately the maximum that can be attained for an ocean depth of 2000 fathoms before acoustic ray bending prevents the rays from reaching the ocean bottom. The distance between the survey ships is therefore limited by the local depth of the ocean bottom and the corresponding angular opening. In order that the overlapping hydrophone surveyed region 43 should exist, the survey ships 10 and 30 must not be too far apart.

The upward directed forward scattered signals associated with the slant beam of ship 10 (resp. 30) are represented by the bounding rays 19 and 20 (resp. 39 and 40). These forward scattered rays provide the angular and depth information of the intership insonified regions 22 (resp. 23).

In FIGS. 2 and 3, the insonified regions 22 and 23 are shown as directed in the approximate direction of the receiver survey ships by projector beam steering. This beam steering is a feature which may be provided to compensate for a misalignment of the survey ships in order to enhance the forward scattered signal strength and overcome any ambiguities in the directivity of the signal. Its use would be dependent on the particular circumstances or requirements that might arise in the surveying process.

Figure 4:
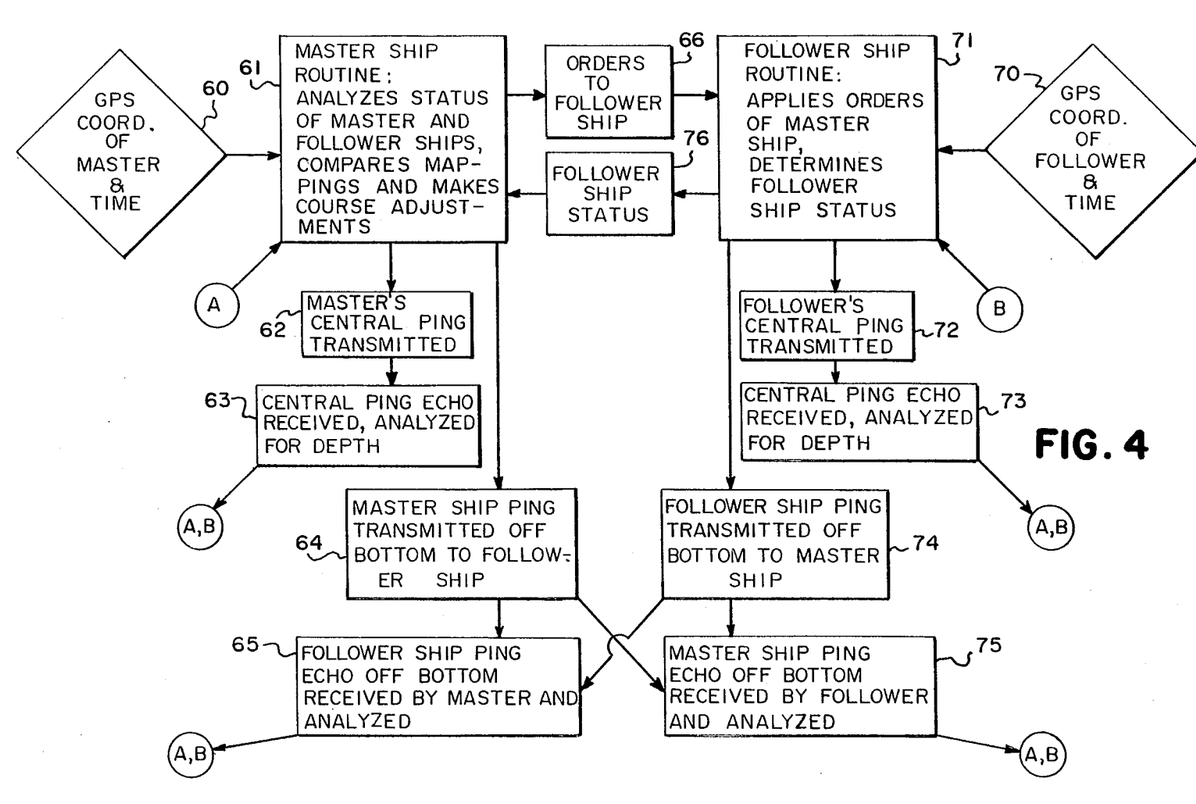
FIG. 4 is a diagram of the main elements of the mapping procedure also indicating the signal processing routes.

In FIG. 4, the main features of the information flow are charted. The GPS position coordinates, time, water temperature, ship velocity, 60, along with depth data 63, 65, 73, and 75, made available by the analysis of previous pings, are input to the master ship routine 61 along with the follower ship status 76 which includes its GPS coordinates, 70 and depth data. The master ship routine 60 analyzes this information, provides control orders 66 to the follower ship routine 71, including course corrections, ping timing directions and beam steering directions. The master ship routine 61 also orders the transmission of the master ship central ping 62, and the master ship slant ping 64. The master ship routine 61 also orders the transmission of the follower central ping 72 and the follower slant ping 74 via the follower ship routine 71.

The master and follower central ping echoes are received and analyzed in blocks 63 and 73 and input to the master ship routine and follower ship routine. The follower ship slant ping is received by the master ship, analyzed and transmitted 65 to both ships. The master ship slant ping is received by the follower ship, analyzed and transmitted 75 to both ships.

Figure 5:
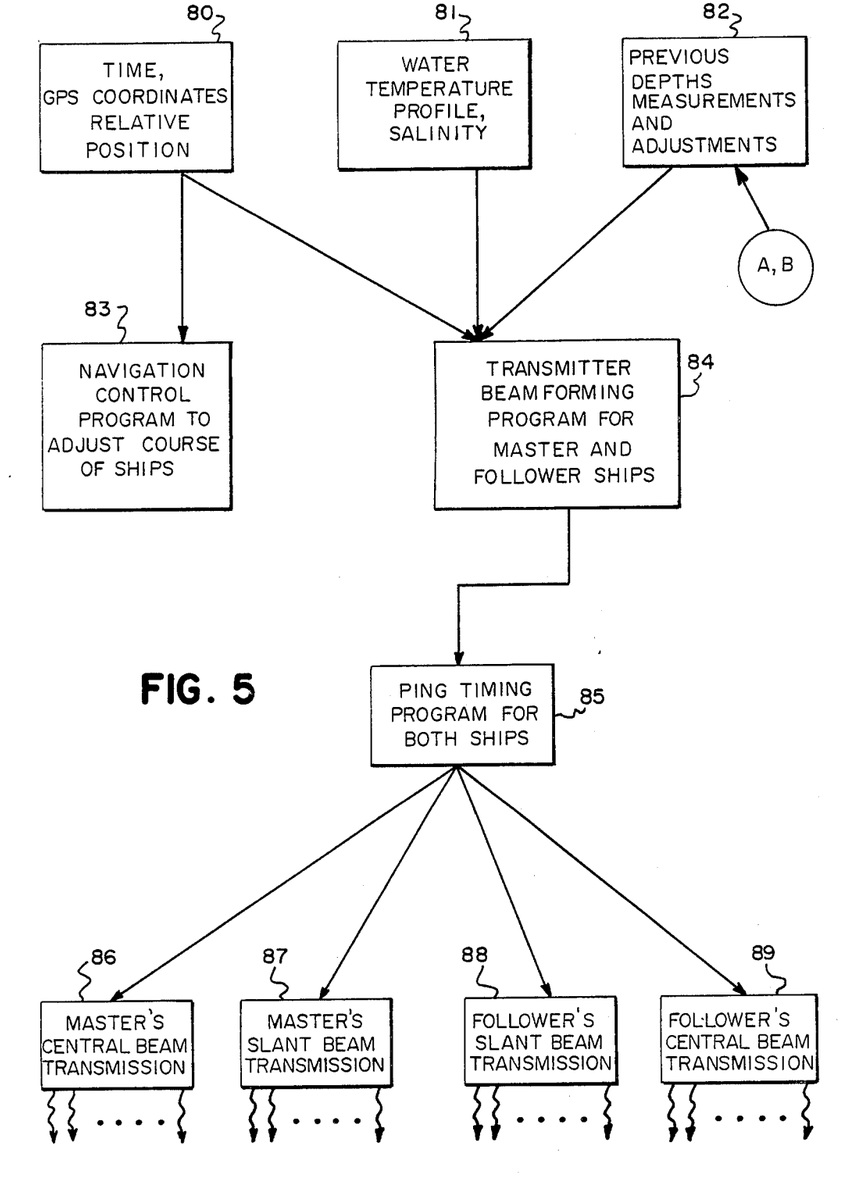
FIG. 5 is a transmission and control procedures flow chart including input requirements and acoustic signal output areas.

FIG. 5 outlines the transmission routine of the pings and the navigational control of the ships. Timing, the GPS coordinates of both ships, and the relative positioning of the ships is input 80 to the master ship control routine. This information is accompanied by the input of the water temperature profile and salinity 81 along with the depth data 82 previously determined. The master ship incorporates this data in preparing velocity and course correction orders for both ships 83. This input information is also employed by the master ship for beam steering in the projectors of both survey ships 84. The beam steering requirements are then utilized by a beam timing program 85 which orders the transmission of the pings, the master ship and follower ship central ping transmissions 86 and 89, respectively, and master ship and follower ship slant pings 87 and 88, respectively.

Figure 6:
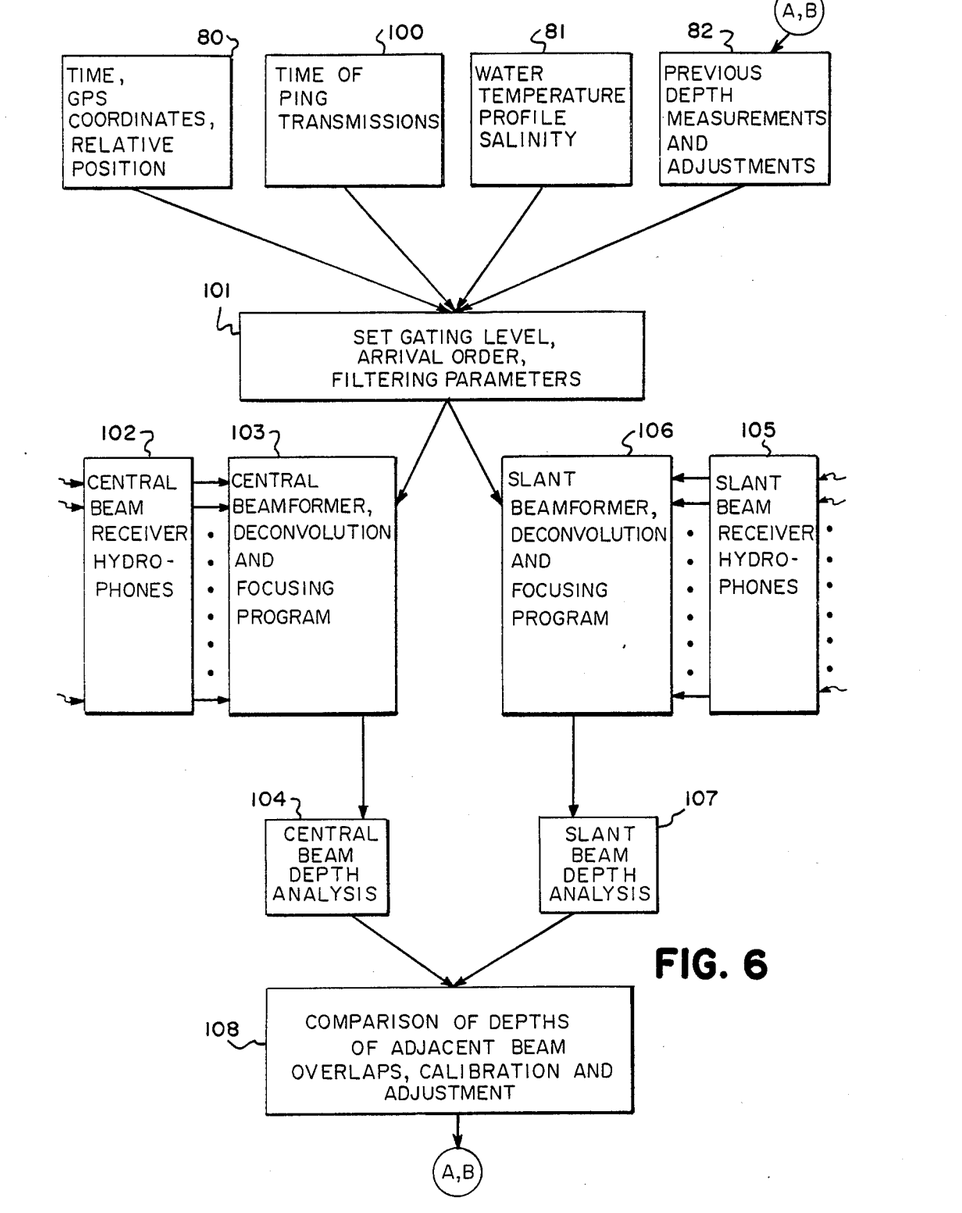
FIG. 6 is a reception procedure flow chart.

In FIG. 6, the scheme for the reception and analysis of the ping echoes is outlined. Both the master and follower ships follow the same pattern here and no distinction is made in this program. As in FIG. 5, the inputs consist of the time, GPS coordinates 80, the water temperature and salinity 81, the depth data 82, along with the time of the ping transmission 100. These inputs are used to set the gating levels of the receiver hydrophones, and the arrival order of rays 101. This information is now used to set parameters for the central receiver beamforming, deconvolution and focusing programs 103 and 106 which respectively receive the inputs from the central beam receiver hydrophones 102 and the slant beam receiver hydrophones 105. These programs, operating on the received data, now determine the contour depth levels of the ocean bottom of the central beams 104 and the slant beams 107 using spectral analysis techniques. This information is then supplied as inputs to compare the depths of overlapping portions of adjacent beams where differences are adjusted, reconciled, and used for calibration 108. This depth data is then made available for analyzing the next set of acoustic data. Also, to avoid confusion, each of the four sets of sonic pulses could be set to a different frequency, so that four frequencies would be necessary. For special applications or conditions more frequencies might also be used.

Figure 7:
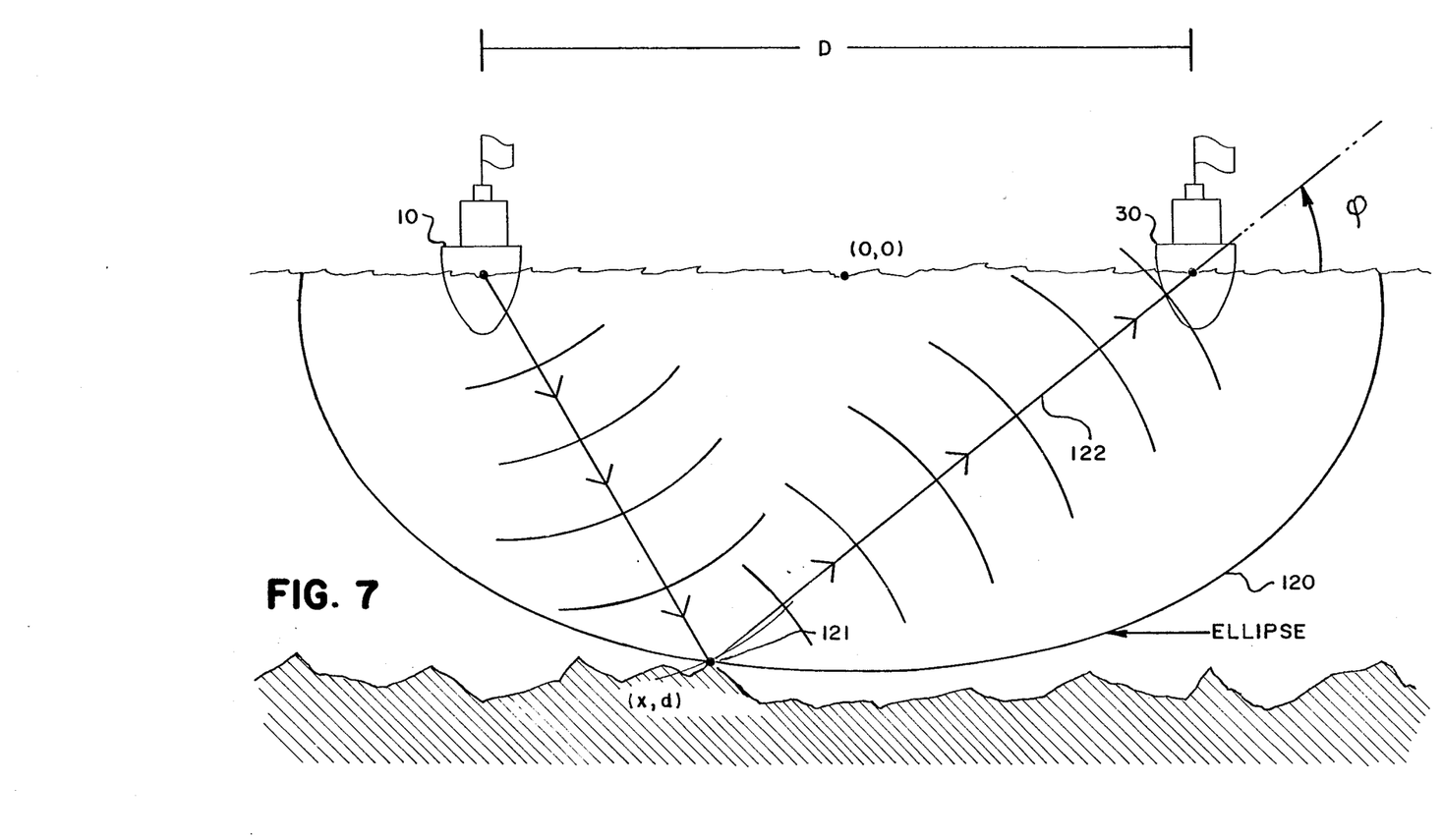
FIG. 7 is a diagram of the geometrical relations for the depth analysis.

FIG. 7 presents a simplified geometrical two dimensional projection of the forward scattered beam depth analysis. Let $t_T$ be the time of the ping transmission by the ship 10 and $t_R$ be the time of ping reception by ship 30, the ships being a distance D apart at their midlines. Now, assuming the speed of sound, c, in water is constant, the distance that the sound can travel in the time interval $\Delta t = t_R - t_T$ is $S = c\Delta t$. Thus, the locus of all points which could be candidates for a bottom scattering point for this time interval $\Delta t$ must require a sound path of total distance S in the ocean between the origin of the ping at the projectors of ship 10 and its reception at the hydrophones of ship 30. The locus of such a set of points will be an ellipse 120, under these simplifying assumptions, with the two ships at the foci. Let the origin (0,0) of the coordinate system be chosen as the midpoint of the line between the survey ships. Now if ship 30 notes that at time $t_R$ it received the signal transmitted at time $t_T$ making an angle $\phi$ with the horizontal, then a line 122 drawn through the center of the hydrophone making an angle $\phi$ with the horizontal between the two ships, will intersect this ellipse in one and only one point (X,d) 121. This is the point on the ocean bottom from which the signal was scattered. Here X is the horizontal coordinate of the point and d is its depth. The equation for this ellipse, 120, is given as:

$$X^2 (S^2 - D^2) + d^2 S^2 = \frac{S^2 (S^2 - D^2)}{4}$$

and the equation of the line, 122, is given as:

$$d = \left( X - \frac{D}{2} \right) \tan \phi$$

These equations can now be solved for X and d to provide the contour level point. Thus, for a particular pulse, the swath depths form the collection of points {(X,d)} determined from the time intervals and angles of arrival of the measured echo receptions.

In reality, the speed of sound in water will vary as a function, of temperature, density, salinity, and other factors. Therefore, the curve 120 will not be a perfect ellipse nor will the curve 122 be a perfect straight line. However, empirical data will be used to make appropriate adjustments so that a correct computation can be carried out based on local conditions.

It will be understood that the above description of the present invention is susceptible to various modifications, changes and adaptations, and the same are intended to be comprehended within the meaning and range of equivalents of the appended claims.

What is claimed is:

1. A system for mapping the ocean bottom through the transmission and reception of underwater sonic pulses which comprises two ships, traveling some distance apart, wherein each of said ships is equipped with means for transmitting sonic pulses to be scattered off the ocean floor in such a direction so that portions of said scattered pulses will be intercepted by its companion ship, means on each ship for receiving said sonic pulses and determining the angles of arrival of said intercepted pulses, means on each ship for determining the time of transmission and the time of reception of said sonic pulses, positioning means on each ship for determining its global location, the system having a relative positioning means for determining the relative position of said ships with respect to each other, communication means on each ship for transmitting and receiving data from its companion ship, the system having means for recording, processing and analyzing said intercepted pulses to determine the depth of the ocean bottom at the locations of the pulse reflections, and the system having a means for recording said analyzed data;

2. The system as defined in claim 1, wherein one of said ships has a means for determining and directing the course, velocity and sonic pulsing of its companion ship.

3. The system as defined in claim 1, wherein one of said ships has means for transmitting approximately fan shaped sonic pulses downward about the vertical and transverse to the ship's longitudinal axis, means for intercepting the backscattered echoes of said sonic pulses and means for determining the angles of arrival of said intercepted pulses, the system also having means for recording, processing, and analyzing the backscatter echoes of said fan shaped, sonic pulses for depth at the locations of the pulse reflections, and the system having means for recording said analyzed data.

4. The system as defined in claim 1, wherein both of said ships have means for transmitting approximately fan shaped sonic pulses symmetrically downward about the vertical and transverse to the ship's longitudinal axis, each ship having means for intercepting the backscattered echoes of said vertical pulses and means for determining the angles of arrival of said intercepted pulses, the system also having means for recording, processing, and analyzing the backscattered echoes of the fan shaped sonic pulses for depth at the locations of the pulse reflections, and the system having means for recording said analyzed data.

5. The system as defined in claim 1, wherein the positioning means on each of said ships for determining its absolute location, and the relative positioning means of the system for determining the relative positions of said ships with respect to each other, are the apparatus and receivers associated with a satellite global positioning system.

6. The system as defined in claim 5, wherein a satellite global positioning system is the NAVSTAR GLOBAL POSITIONING SYSTEM.

7. The system as defined in claim 1, wherein each of said ships has a means for determining and directing the course, velocity and sonic pulsing of the other ship.

8. A method for mapping the ocean bottom comprising the steps of having two sonar survey ships, each equipped with means for transmitting and intercepting underwater sonic pulses off the ocean floor, travel some distance apart along approximately parallel course, having each of said ships transmit, at specified time intervals, sonic pulses to be scattered off the ocean floor in such a direction that portions of said scattered pulses are intercepted by its companion ship, having said ships kept to courses sufficiently close to each other to be able to intercept portions of said scattered sonic pulses, providing each of said ships with a data transmission and reception communication system, providing positioning data to said ships allowing each of said ships to determine its global location and its relative position with respect to its companion ship, providing each of said ships with the times of transmission of said pulses, having each of said ships determine the times it intercepts portions of said pulses, having each of said ships determine the angles of arrival of portions of said scattered sonic pulses it intercepts, having at least one of said ships record the angles of arrival, position and time data of the received portions of said pulses, having at least one of said ships process and analyze the intercepted pulses to determine the depths of the ocean at the locations of the pulse reflections, and having at least one of said ships record this analyzed data.

9. The method of claim 8, further comprising the steps of designating one of the two ships as the controlling or master ship, this ship to determine the course and velocity of both ships, and also to determine the timing of the transmission of the sonic pulses of both ships.

10. The method of claim 8 also comprising the steps of having one of said ships transmit, at specified time intervals, approximately fan shaped sonic pulses downward about the vertical and transverse to the ship's longitudinal axis, having said ship then intercept the backscattered echo portions of said sonic pulses, record the time of transmission and reception of said pulses, having said ship determine the angles of arrival of the various backscattered echo receptions, having at least one of said ships process and analyze the sonic pulse data to determine the depths and locations of the ocean bottom backscattering positions, and having at least one of said ships record the analyzed data.

11. The method as defined in claim 8 also comprising the steps of having both of said ships transmit, at specified time intervals, approximately fan shaped sonic pulses downward about the vertical and transverse to the ship's longitudinal axis, having each of said ships then intercept the backscattered echoes of its transmitted sonic pulses, record the time of transmission and reception of said pulses, determine the angles of arrival of the various backscattered echo receptions, and also having at least one of said ships process and analyze said sonic pulse data to determine the depths and locations of the ocean bottom backscattering positions, and having at least one of said ships record the analyzed depth data.

12. The method as defined in claim 11, wherein each set of pulses is of a different frequency from the other sets of pulses.

13. The method defined in claim 8, also comprising the further steps of having said received pulse echoes analyzed so as to produce overlapping depth data for portions of the insonified regions on the ocean bottom.

14. The method defined in claim 10, also comprising the further steps of having said received pulse echoes analyzed so as to produce overlapping depth data for portions of the insonified regions on the ocean bottom.

15. The method defined in claim 11, also comprising the further steps of having said received pulse echoes analyzed so as to produce overlapping depth data for portions of the insonified regions on the ocean bottom.

16. The method defined in claim 8, wherein the positioning data provided to said ships shall come from a satellite global positioning system.

17. The method defined in claim 16, wherein a satellite global positioning system is the NAVSTAR GLOBAL POSITIONING SYSTEM.

* * * * *